Figure 1:
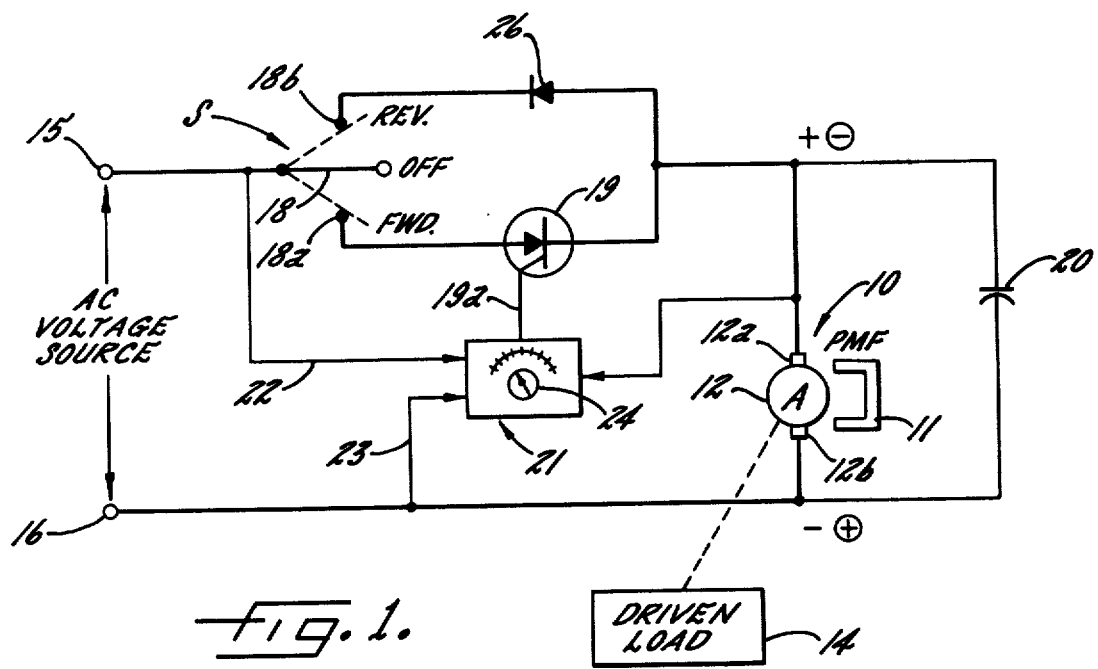

United States Patent

Means

[11] 4,020,403
[45] Apr. 26, 1977

[54] REVERSING CONTROL FOR DC. MOTORS OF THE PERMANENT MAGNET FIELD TYPE

[75] Inventor: William A. Means, Rockford, Ill.
[73] Assignee: Applied Motors, Inc., Rockford, Ill.
[22] Filed: Jan. 10, 1975
[21] Appl. No.: 540,126
[52] U.S. Cl. .............................. 318/257; 318/293
[51] Int. Cl.² ............................................. H02P 7/08
[58] Field of Search .......... 318/245, 256, 257, 264, 318/280, 283, 297, 291, 293, 322, 345, 294, 295, 289, 300, 331, 336

[56] References Cited
UNITED STATES PATENTS

| | | | |
|---|---|---|---|
| 3,184,670 | 5/1965 | Reynolds | 318/300 |
| 3,222,583 | 12/1965 | Gutzwiller | 318/331 X |
| 3,551,768 | 12/1970 | Lagier | 318/245 |
| 3,678,354 | 7/1972 | Kitanosono et al. | 318/294 |
| 3,818,310 | 6/1974 | Smith | 318/293 X |

Primary Examiner—Robert K. Schaefer
Assistant Examiner—W. E. Duncanson, Jr.
Attorney, Agent, or Firm—Leydig, Voit, Osann, Mayer & Holt, Ltd.

[57] ABSTRACT

A simple and economical system for operating a dc. motor of the permanent magnet field type from an ac. supply, characterized in that the motor may be driven at an adjustable speed in a forward direction by energization through a controlled half wave rectifier (e.g., SCR) or at a fixed, high speed in the reverse direction by energization through a half wave diode rectifier.

2 Claims, 2 Drawing Figures

REVERSING CONTROL FOR DC. MOTORS OF THE PERMANENT MAGNET FIELD TYPE

The present invention relates in general to control systems for dc. motors, and in particular to systems for selectively and reversibly energizing dc. motors of the permanent magnet field type from an ac. source.

In some applications of dc. motors, it is desirable to energize the motor for operation in a forward direction and at adjustable speeds by energy drawn from a conventional ac. supply, but under certain circumstances, to run the motor in a reverse direction at a fixed, non-adjustable speed. For example, it may be desired to drive a lead screw to linearly move a machine tool member at a speed which is adjustable according to the needs of a working stroke, but then rapidly to retract the member to a home position withhout regard to the particular retraction speed. In another case, it is desirable to drive the impeller of a milk cooling machine forwardly at relatively low but adjustable speeds during a cooling cycle, but thereafter to turn the impeller reversely and rapidly —while the milk cooler tank is being rinsed with water.

With the advent and widespread usage of permanent magnet field (PMF) type dc. motors, which are desirable because of their low cost and good performance characteristics, it is no longer possible to reverse the direction of rotation by switching the polarity of the dc. voltage applied to either the field or the armature. Only the armature voltage can be reversed for this purpose.

For the PMF dc. motor to be operated selectively in forward or reverse directions from an ac. energy source, there are the choices of either (a) converting the ac. voltage into a dc. voltage and the switching the polarity, and varying the magnitude, of the dc. voltage applied to the motor armature in order to control rotational direction and speed, or (b) passing the ac. voltage through a full-wave rectifier bridge containing two controlled rectifiers (e.g., SCR's) selectively activated, in order to control rotational direction and speed. In case (a), the switching and reversing of the dc. voltage requires heavy duty switches with arc suppression. In case (b), the use of a full-wave rectifier bridge with two SCR's requires several relatively expensive components and two circuits for supplying adjustable control signals to the SCR's. This involves an expensive array of components. Both conventional approaches (a) and (b) are thus relatively expensive and complex for applications of the sort described above where control or adjustment of speed in one rotational direction is not demanded.

It is the primary aim of the present invention to bring forth a very simple, reliable and inexpensive system for controlled energization of a PMF type dc. motor from an ac. source, —and which enables the motor speed in one direction to be variably adjusted but which operates the motor in the other direction at a predetermined, relatively fixed speed.

Another object is to provide such a control system wherein a single selector switch, i.e., one having single pole, double throw action, serves to select the off, forward or reverse modes of operation by switching ac. voltage rather than dc. voltage, and which therefore requires no arc suppression.

Still another object is to enhance the simplified control system by an unpolarized capacitor which serves to smooth the half wave or partial wave dc. pulsations otherwise applied to the motor.

Figure 2:
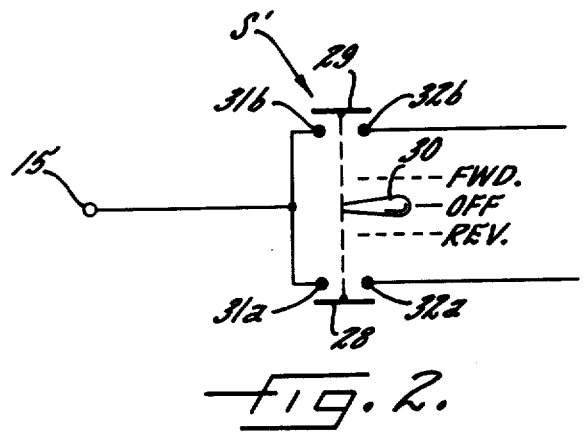

These and other objects and advantages of the present invention will become apparent as the following description proceeds, taken in conjunction with an accompanying drawing in which:

FIG. 1 is a schematic circuit diagram for a control system constituting a preferred and exemplary embodiment of the invention; and FIG. 2 is a diagrammatic representation of a switch construction which may be used in lieu of that illustrated in FIG. 1.

While the invention has been shown and will be described in some detail with reference to a particular embodiment thereof, there is no intention that it thus be limited to such detail. On the contrary, it is intended here to cover all modifications, alternatives and equivalents falling within the spirit and scope of the invention as defined by the appended claims.

The permanent magnet field type of dc. motor 10 to be controlled in keeping with the present invention is illustrated in FIG. 1 as including a permanent magnet 11 (usually carried by the motor casing and stator) which produces a magnetic field cooperating with an armature 12 having the usual windings electrically connected through brushes 12a and 12b riding on the rotor commutator (not shown). The armature is usually a part of the rotor journaled in the motor housing and having a shaft which is coupled to a driven load 14.

The motor 12 is to be operated selectively in a forward or reverse direction, with the forward speed being adjustable, by energy drawn from a conventional ac. supply, the latter being here represented simply by the terminals 15, 16 of a conventional 120 VAC source.

In accordance with the present invention, a single pole, double throw switch S having a movable blade 18 is utilized to select the off, forward or reverse operation of the motor 10. Means are provided to establish a first circuit from the ac. supply terminals 15, 16 through the motor armature 12 via the switch S when the latter is in its first or "forward" position, such first circuit including a controlled half wave rectifier here illustrated by way of example as a silicon controlled rectifier (SCR) 19. The first circuit thus extends from terminal 15, through the switch blade 18 (when in its lower position), the forward switch contact 18a, the anode-cathode path of the SCR 19, the brush 12a, the armature 12, the brush 12b and back to the terminal 16. Whenever the SCR 19 is conditioned by a control voltage applied to its gate 19a, then current will flow through the described circuit during those positive half cycles of the ac. source voltage which make the terminal 15 positive relative to the terminal 16. In these circumstances, a pulsating dc. voltage of the polarity represented by uncircled symbols in FIG. 1 will be applied to the motor armature 12, and the motor 10 will thus drive the load 14 in a forward direction. For the purpose of smoothing and averaging the pulsating dc. voltage so applied to the armature 12, a capacitor 20 is connected in parallel with the armature, this capacitor being of the non-polarized electrolytic type, for the reason which will become apparent below.

Appropriate means are included in the control system for applying a variable amplitude or variable phase control signal to the gate 19a of the SCR 19, so as to adjust, in well known fashion, the phase angle at which the SCR "fires" or becomes conductive during each positive half cycle of the voltage applied thereto. For this purpose, a conventional triggering control unit 21 receives the ac. source voltage via conductors 22, 23, and includes an adjustable knob 24 for setting the phase or magnitude of the voltage which is applied to the gate terminal 19a. If desired, the unit 21 may include a Zener diode for establishing an adjustable speed reference voltage which is compared with the voltage across the armature 12 in order to change the signal supplied to the gate 19a, and thus to make the firing angle greater or less until the motor runs uniformly at the speed selected by the adjustment or setting of the knob 24.

It will be understood, of course, that controlled rectifiers of specific types other than SCR's may be utilized, and in that event, the firing control unit 21 will be tailored to the requirements of the particular controlled rectifier which is chosen.

Further in carrying out the present invention, means are provided to establish a second circuit from the ac. supply through the motor armature 12 via the switch S when the latter is in its second or "reverse" position, such second circuit including a conventional half wave diode rectifier 26. The rectifier 26 and the SCR 19 are oppositely poled such that, when conducting, they respectively pass current in opposite directions through the armature 12. In the specific embodiment here shown the anode of diode 26 is connected to the cathode of the SCR 19, and the two are directly connected to the brush 12a. It will be seen from inspection that in the exemplary embodiment, the second series circuit extends from the terminal 16 through brush 12b, armature 12, brush 12a, diode 26, the reverse terminal 18b of the switch S (when the blade 18 is in the reverse position), and back to the ac. supply terminal 15. Thus, when the switch S is in its reverse position, the diode 26 will be conductive only during those half cycles of the ac. supply voltage which make the terminal 19 positive relative to the terminal 15, but the diode 26 will always be conductive during the substantial entirety of those half cycles. Therefore, half-wave rectified pulsating current and voltage of the polarity indicated by the circled symbols in FIG. 1, will be applied to the motor armature 12, —causing the motor to drive the load 14 in a reverse direction but at a high and non-adjustable speed. The capacitor 20 will in this case again perform its smoothing action to minimize pulsations in the torque in the motor 12, but the voltage across the capacitor 20 will in this instance be opposite to that described earlier. For this reason, a non-polarized capacitor is employed. If it should happen that the motor runs reversely at a speed higher than that desired when the second-described circuit is operating, then a simple resistor may be connected in series with the diode 26 to bring the fixed reverse speed down to a particular desired value.

The simple control circuit here described thus enables the motor 12 to be turned off simply by centering the switch blade 18; and it enables the motor 12 to be operated in a forward direction (at a speed which is adjustable merely by setting the control knob 24 so as to vary the firing angle of the controlled rectifier 19) —after the switch blade 18 has been moved to its forward position. On the other hand, when the switch blade 18 is moved to its reverse position, the voltage applied to the motor armature 12 by conduction of the diode 26 is of opposite polarity and of an average value which corresponds to full half-wave rectification. Thus, the motor operates reversley at a substantially fixed speed which, in applications of the sort mentioned above, is not particularly critical. The flexibility of reversing the motor 12 and being able to adjust its operating speed when running in one direction is achieved by the simple and inexpensive components which need include only the controlled rectifier 19, the diode 26, the switch S, and the firing control unit 21. All of these components, as well as the smoothing capacitor 20, are standard items readily available at low cost.

Indeed, the switch S here shown as a conventional single pole, double throw switch, is a very common low cost item which, in the present system, requires no arc suppression elements in view of the fact that it merely turns on or off pulsating current. Any switch which provides single pole, double throw action will, however, suffice and FIG. 2 illustrates one equivalent alternative. As shown in FIG. 2, switch S' may be simply a manual switch having two movable blades 28, 29 with a finger piece 30 movable to the three positions, "off", forward and reverse. A common terminal is formed by contact points 31a and 31b both connected to the ac. supply terminal 15; and two output terminals or contact points 32a, 32b correspond to the output terminals 18a, 18b in FIG. 1. When the switch S' is substituted for the switch S in FIG. 1, and the finger piece 30 is moved upwardly to a forward position so as to bridge the blade 28 across its cooperating stationary contacts 31a, 32a, the first circuit through controlled rectifier 19 is completed; and when the finger piece is moved to the lower or reverse position, the blade 29 will bridge the associated stationary contacts 31b, 32b to complete the second circuit through the motor armature 12 and the diode 26.

The present control system is simple and yet low in cost by virtue of the fact that the capability for operating the motor reversely at adjustable speeds is eliminated. The simple half-wave rectifying diode 26 suffices for reverse operation at fixed speed; yet any need for switching of filtered dc. voltage is eleminated, and any need for controlled full-wave rectification of the ac. source voltage is also avoided.

I claim:

1. In a reversing control system for operating a dc. motor from an ac. supply, the combination comprising
   a. a single pole, double throw switch,
   b. means including a controlled half-wave rectifier establishing a first circuit from the ac. supply through the motor armature via said switch when the latter is in a first position,
   c. means including a diode half-wave rectifier establishing a second circuit from the ac. supply through the motor armature via said switch when the latter is in a second position, said diode being oppositely poled in relation to said controlled rectifier, and
   d. means for applying an adjustable control signal to said controlled rectifier to vary the angle of conduction thereby during forward half waves,
   whereby said motor runs at an adjustable speed in one direction when said switch is in its first position but runs at a high speed in the opposite direction when said switch is in its second position.

2. In a reversible drive system energizable from an ac. supply, the combination comprising
   a. a dc. motor having a permanent magnet field,
   b. a diode half-wave rectifier.
   c. a controlled half-wave rectifier,
   d. a two-position switch providing single pole, double throw action, and having a common terminal and two output terminals respectively joined to the common when the switch is in first and second positions, e. means for connecting said motor, said controlled rectifier, and the common and one output terminal of said switch in a first series circuit with the ac. supply, f. means for connecting said motor, said diode rectifier, and the common and other output terminal of said switch in a second series circuit with the ac. supply, g. said diode rectifier and controlled rectifier being oppositely poled with respect to said motor to respectively pass, when conductive, current in opposite directions through the motor, and h. means for supplying an adjustable control signal to said controlled rectifier to vary the angle of conduction at which the latter conducts during positive half cycles of voltage applied thereto, whereby said motor runs with high speed in one direction when said switch is in one position, and runs at an adjustable speed in the opposite direction when the switch is placed in its other position.

* * * * *